United States Patent [19]

Baker et al.

[11] Patent Number: 4,689,511

[45] Date of Patent: Aug. 25, 1987

[54] DRAIN ASSEMBLY FOR AN ELECTRIC MOTOR

[75] Inventors: Gerald N. Baker; Carl R. Fischer, both of St. Louis County, Mo.

[73] Assignee: Emerson Electric Co., St. Louis, Mo.

[21] Appl. No.: 846,356

[22] Filed: Mar. 31, 1986

[51] Int. Cl.⁴ ............................................... H02K 5/10
[52] U.S. Cl. ...................................... 310/88; 310/157; 277/68; 417/424
[58] Field of Search .................. 310/88, 89, 90, 85, 310/157; 417/424; 277/67, 68, 69; 134/104; 384/132, 477, 478

[56] References Cited

U.S. PATENT DOCUMENTS

| | | | |
|---|---|---|---|
| 3,846,652 | 11/1974 | Lykes | 310/88 |
| 4,287,662 | 9/1981 | Otto | 310/88 |
| 4,535,262 | 8/1985 | Newberg | 310/88 |

FOREIGN PATENT DOCUMENTS

| | | | |
|---|---|---|---|
| 1538990 | 12/1980 | Fed. Rep. of Germany | 310/85 |
| 3305297 | 8/1984 | Fed. Rep. of Germany | 310/85 |
| 322382 | 6/1970 | Sweden | 277/67 |

*Primary Examiner*—R. Skudy
*Attorney, Agent, or Firm*—Polster, Polster and Lucchesi

[57] ABSTRACT

An improved drain structure for a vertically mounted electric motor to be positioned below a liquid sump into which the rotor shaft of the motor can be connected including a drip pan through which the rotor shaft passes, the pan having peripheral side walls and drain means attached thereto and a liquid slinger above the pan adapted to sling liquid leakage in a radially outward direction below the pan side walls to be drained away from the motor.

10 Claims, 4 Drawing Figures

DRAIN ASSEMBLY FOR AN ELECTRIC MOTOR

BACKGROUND OF THE INVENTION

This invention relates to electric motor structure and more particularly to an improved drain structure for a vertically mounted electric motor to be positioned below a liquid sump into which the rotor shaft of the motor can be connected.

It is generally well known to mount an electric motor below a liquid sump to connect the motor to a sump pump or the like, such as in dishwasher applications. Liquid leakage may sometimes occur along the seal between the sump pump and the rotor shaft, the leakage, if not noticed and stopped, exposing the several parts of the motor to what could prove to be serious damage.

Various types of arrangements have been utilized to direct liquid leakage from the sump away from the electric motor, including splash guards mounted on the rotor shaft between the seal and the endshield and more recently the structural arrangement, as disclosed in U.S. Pat. No. 4,535,262, has been utilized wherein the endshield itself is contoured to direct liquid to drain holes in the endshield for discharge of the liquid at a location removed from the motor parts. These past arrangements, for the most part, have been comparatively complex and expensive in manufacture and assembly and particularly have failed to be effective in situations where the upper surface of the endshield has been utilized to gather and drain liquids with an external rotating part thereabove, the rotating part often throwing or misting the liquid on the upper surface of the endshield so that it might coat exposed parts adjacent the motor as well as in the motor.

The present invention, recognizing the problems of the various structures of the past, including those of the more recent past, provides an improved drain structure for an electric motor which is comparatively straightforward and inexpensive in manufacture and assembly and yet assures proper removal and drainage of any liquid leakage from a sump above the motor, even though the upper endshield of such motor structure might further include an external rotating part thereabove. In addition, the present invention recognizes and resolves problems associated with formation of liquid menisci, as well as the undesirability of uncontrolled liquid sprays and mist, particularly in instances where rotating parts external of the motor and below the sump are utilized, the present invention providing a unique structural arrangement to avoid any such structural problems.

Various other features of the present invention will become obvious to one skilled in the art upon reading the disclosure set forth herein.

SUMMARY OF THE INVENTION

More particularly, the present invention provides an improved drain structure for a vertically mounted electric motor to be positioned below a liquid sump into which the motor shaft of the motor can be connected comprising: an electric motor including an upper endshield surrounding at least a portion of the stator and rotor assembly of the motor, the endshield having the rotor shaft of the motor extending therethrough; a liquid drip pan mounted above the endshield, the drip pan having an aperture therein through which the rotor shaft passes, the pan having an upwardly extending peripheral side wall; drain means communicating with the peripheral side wall of the drip pan and extending laterally outward therefrom beyond the outer extremities of the upper endshield of the motor to isolate liquid from the several parts of the motor; and, liquid slinger means fixed in sealed relation to the rotor shaft above the liquid drip pan to sling liquid leakage in a radially outward direction below the upper edge of the drip pan side wall to be drained through the drain means. In addition, the present invention provides opposed laterally spaced overlapping lip members on the liquid slinger and drain respectively, the lips being so spaced and positioned that meniscus liquid leakage is prevented. Further, the present invention provides drain pan structure which guides liquid leakage to a preselected location, and also provides a unique way of removably mounting the liquid pan on the motor endshield to ensure gravity drainage.

It is to be understood that various changes can be made by one skilled in the art in the arrangement, form and construction of the several parts of the apparatus disclosed herein without departing from the scope or spirit of the present invention. For example, the type, shape and positioning of the liquid drip pan and associated drain troughs could be varied, the overlapping menisci controlling lip positions and form could be changed, and the liquid slinger form and contour could be modified without departing from the present invention.

BRIEF DESCRIPTION OF THE DRAWINGS

Referring to the drawings which disclose one advantageous embodiment of the present invention.

DESCRIPTION OF THE PREFERRED EMBODIMENT

Figure 1:
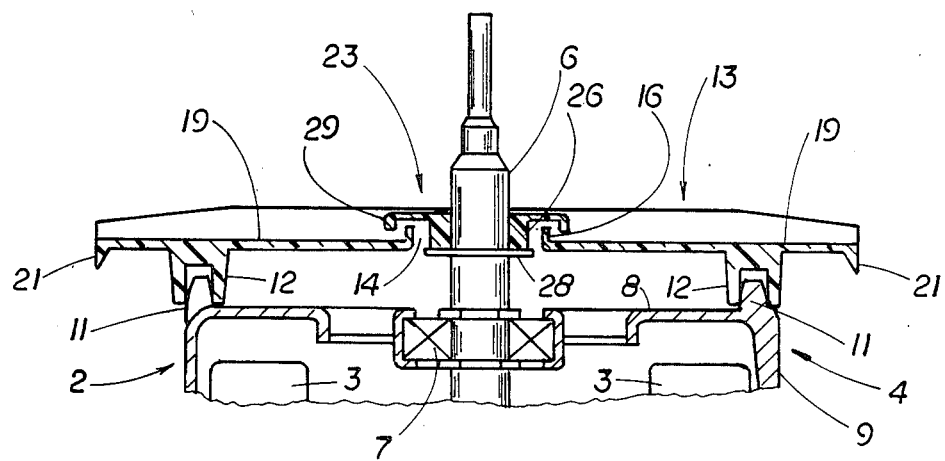
FIG. 1 is a cross-sectional view of the upper portion of a typical electric motor (parts of which are not shown to simplify illustration), incorporating the inventive drain assembly.

Referring to FIG. 1 of the drawings, motor 2, which can be an induction type motor and of which only the upper portion is shown for purposes of simplification, includes a stator and rotor assembly with a rotor shaft vertically extending therefrom journalled in the end walls of endshields which surround the stator and rotor assembly, there being shown in FIG. 1 the upper portion of stator 3, the upper portion of upper endshield 4, the upper portion of rotor shaft 6 and centrally disposed upper cradle and bearing assembly 7 formed in the end wall 8 of upper endshield 4. Advantageously, upper endshield 4 can be of a one-piece diecast construction mold formed from a suitable aluminum alloy or the like. Endshield 4, which includes end wall 8 with the central disposed cradle and bearing assembly 7, also includes the downwardly depending peripheral side wall and spaced opposed upwardly extending vertical male standards 11 substantially adjacent and above downwardly extending side wall 9.

Figure 2:
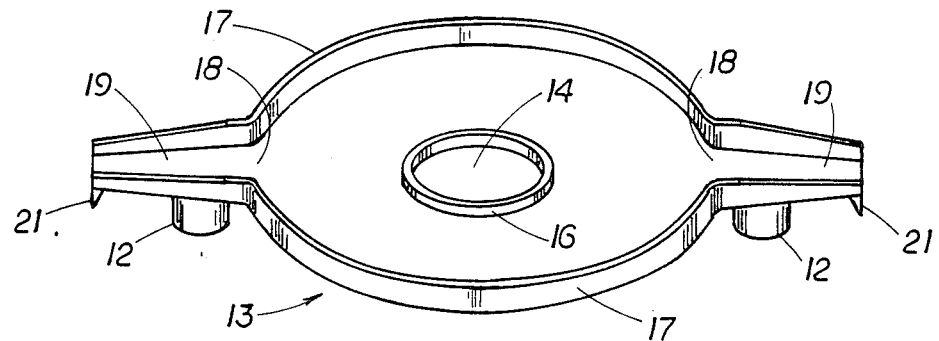
FIG. 2 is a perspective upper view of the upper portion of the drip pan comprising a part of the inventive structure.

As can be seen in FIGS. 1 and 2, standards 11 matingly engage with substantially equally spaced female socket members 12 extending from the drain troughs of the lower face of a liquid drip pan 13 to hold drip pan 13 in a substantially horizontal position a preselected distance above end wall 8 of endshield 4. Pan 13 and socket members 12 can be formed integrally from any one of a number of suitable sturdy liquid resistant materials, such as plastic and, in accordance with the present invention, the manufacturing tolerances between the mating standards 11 and socket members 12 are selectively such that, in the event of any inaccurate fit, the pan 13 would bow downwardly toward its peripheral edge.

As disclosed in FIGS. 1 and 2 of the drawings, drip pan 13 has a central circular aperture 14 therein through which rotor shaft 6 freely passes when the pan is mounted on standards 11 of the endshield 4. The pan 13 is formed to further provide an integral upwardly extending vertical lip or weir member 16 surrounding aperture 14 as well as an upwardly extending vertical peripheral side wall 17. Wall 17 which serves as a liquid baffle and is of preselected height has opposed drain openings 18 and integral with and extending laterally outward in communication with drain openings 18 as part of pan 13 are a pair of opposed drain troughs 19, the side wall 17 extending in a downwardly sloping fashion along the opposed side edges of the drain troughs.

Figure 4:
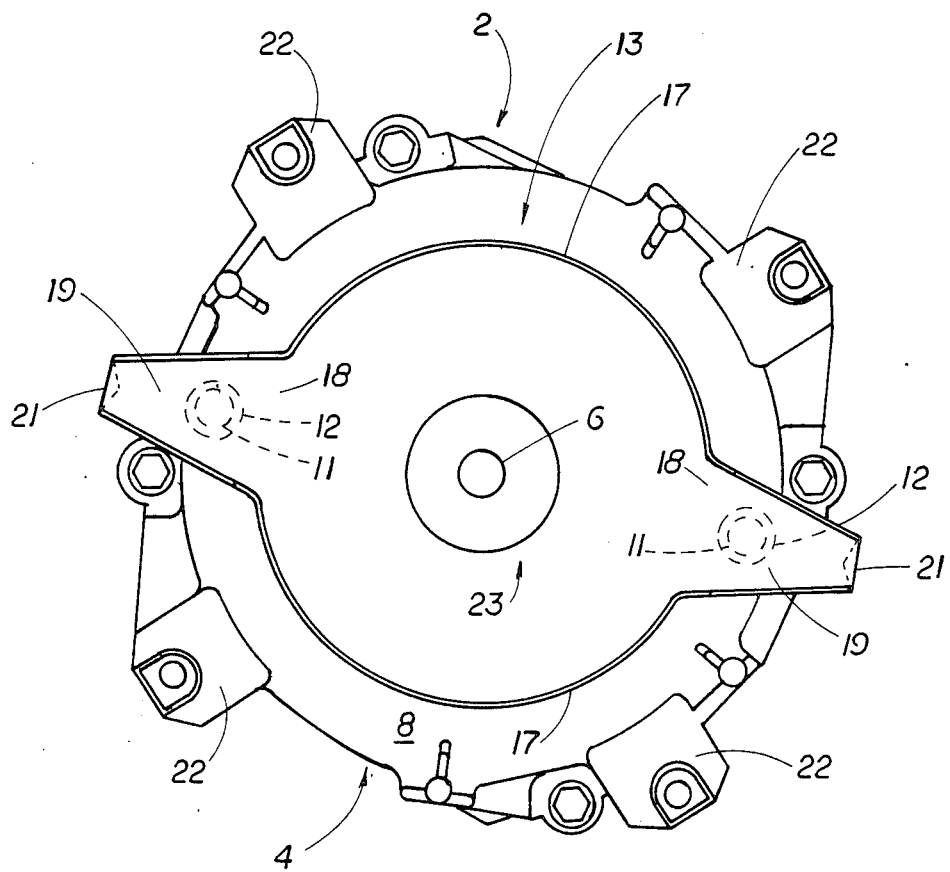

Referring to FIG. 1, it is to be noted that drain troughs 19 which can be an integral part of drip pan 13, as shown, are sized to extend laterally outward beyond the outer extremities of the upper endshield 4 for motor 2 so as to be capable of isolating any liquid leakage into drip pan 13 from the several parts of motor 2. As can be seen in FIG. 4, each trough 19 is designed to neck inwardly as it extends outwardly in a funnelling manner and, as can be seen in FIG. 2, each trough terminates at its lower surface in a downwardly extending, outwardly sloping drain lip 21 to further ensure liquid draining beyond the upper endshield of the motor. It is to be noted in FIG. 4, that the endshield 4 can be provided with a plurality of apertured bosses 22 (shown in FIG. 4 only). These bosses 22 serve to receive appropriate bolt and nut assemblies (not shown) to support motor 2 below an appropriately bottom sealed liquid sump of a dishwasher, or the like, having a part such as an internal pump to which rotor shaft 6 can be connected (also not shown). It also will be noted in FIG. 4 that standards 11 are so positioned as to mount liquid drip pan 13 horizontally in such a fashion that troughs 19 extend intermediate bosses 22.

Figure 3:
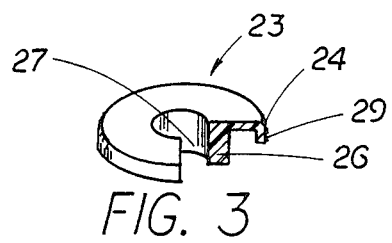
FIG. 3 is a perspective, partially broken away view of the slinger ring which is mounted on the rotor shaft as disclosed in FIG. 1; and, FIG. 4 is a top plan view of the motor structure and drain assembly of FIG. 1.

Referring to FIGS. 1 and 3, mounted above liquid drip pan 13 is a flat, annular, liquid resistant slinger ring 23 which can be formed from any one of a number of suitable liquid resistant materials such as a flexible rubber. Ring 23 is so formed that its upper peripheral edge is rounded at 24. Advantageously, this rounding has a minimum curvature radius of approximately 0.125 inches, the rounding serving to assure liquid slinging and to minimize liquid spray beyond side wall 17 of drip pan 13. Ring 23 is provided with a collar member 26 integral with and extending downwardly from the periphery of central aperture 27 of ring 23. The aperture 27 and collar member 26 are so sized that collar member 26 snugly engages in liquid sealing relation with rotor shaft 6 about which it is fixedly mounted. The extremity of collar member 26 engages a stop ring 28 mounted in a groove on shaft 6.

Slinger ring 23 is sized to extend in overlapping relation with aperture 14 of liquid drip pan 13 and is held in substantially parallel preselected spaced relation therefrom by the stop ring 28 which is abutted by collar member 26. Slinger ring 23 is provided with a downwardly extending annular peripheral lip or weir 29 extending downwardly therefrom in spaced, overlapping opposed relation with upwardly extending lip 16 on drip pan 13. Advantageously and in accordance with this invention, it has been found desirable that the spacing between opposed side faces of lip member 16 and 29 and the spacing between the opposed edge face of downwardly extending lip 29 and the upper face of the overlapped drip pan 13 each be equal to or less than approximately 0.187 inches so that the meniscus liquid leakage through the drip pan aperture 14 is prevented.

In operation, any liquid leakage from a sump above the motor is caught by liquid drip pan 13 and flows or is slung outwardly by slinger ring 23 to abut against side wall 17, the liquid passing through side wall openings 18 into outwardly extending drain troughs 19 to fall from drain lips 21 harmlessly away from the motor parts. As above noted, the preselectively spaced, overlapping lips 29 and 16 of the slinger ring 23 and drip pan 13 respectively serve to prevent any meniscus leakage through aperture 14 into the several motor parts.

Thus, from the abovedescribed structure, it can be seen that various advantageous features including those abovenoted are achieved in a comparatively simple, compact, straightforward, inexpensive and efficient manner and that various changes can be made by one skilled in the art in the several parts of the structure without departing from the scope or spirit of this invention. For example, the liquid drip pan could be mounted at a slight angle to gravity favor one drain trough over the other, the slinger shape and lip shapes could be varied in design and contour and the materials utilized could be changed.

The invention claimed is:

1. An improved drain structure for a vertically mounted electric motor to be positioned below a liquid sump into which a rotor shaft of the motor can be connected comprising:
    an electric motor including a rotor shaft, and an upper endshield surrounding at least a portion of the motor, said endshield having the rotor shaft of said motor vertically extending therethrough;
    a liquid drip pan mounted above said endshield, said drip pan having an aperture therein through which said rotor shaft passes, said pan having an upwardly extending peripheral side wall;
    drain means communicating with said peripheral side wall of said drip pan and extending laterally outward therefrom beyond the outer extremities of said upper endshield of said motor to isolate liquid from the several parts of said motor; and,
    liquid slinger means fixed in sealed relation to said rotor shaft above said liquid drip pan to sling any liquid leakage from said sump in a radially outward direction below the upper edge of the peripheral side wall of said drip pan to be drained through said drain means.

2. The drain structure of claim 1, said liquid slinger means including a flat slinger ring spaced from and sized to overlap said aperture in said drip pan through which said rotor shaft passes, said ring having a second aperture therein through which said rotor shaft passes in snug, liquid sealing relation.

3. The drain structure of claim 1, said liquid slinger means including a flat slinger ring spaced from and sized to overlap said aperture in said drip pan through which said rotor shaft passes, said ring having a second aperture therein, and a collar member extending downwardly from said second aperture through which said rotor shaft passes in snug, liquid sealing relation; and, a first annular lip member extending downwardly from said slinger ring and a second annular lip member surrounding said aperture in said liquid drip pan and extending downwardly from said drip in spaced overlapping opposed relation with the relative lateral spacing between opposed side faces of said lip members and the spacing between the opposed edge face of the downward lip and the upper face of the overlapped drip pan being so preselected that meniscus liquid leakage into said drip pan aperture is prevented.

4. The drain structure of claim 1, said liquid slinger means including a flat annular slinger ring spaced from and sized to overlap said aperture in said drip pan which is of circular shape and through which said rotor shaft passes, said ring having a collar member integral with and extending outwardly of said central aperture, said rotor shaft passing therethrough in snug, liquid sealing relation; and a first annular lip member extending downwardly from an outer periphery of said slinger ring and a second annular lip member extending upwardly from a periphery of said aperture in said liquid drip pan in spaced overlapping opposed relation with the spacing between opposed side faces of said lip members and the spacing between the opposed edge face of the downwardly extending lip and the upper face of the overlapped drip pan, each being equal to or less than approximately 0.187 inches so that meniscus liquid leakage into said drip pan aperture is prevented.

5. The drain structure of claim 1, said liquid slinger means including a flat slinger ring spaced from and sized to overlap said aperture in said drip pan through which said rotor shaft passes, said ring having an aperture therein through which said rotor shaft passes in snug, liquid sealing relation, at least an upper peripheral edge of said ring being so rounded as to assure liquid slinging and to minimize liquid spraying.

6. The drain structure of claim 1, said liquid slinger means including a flat slinger ring spaced from and sized to overlap said aperture in said drip pan through which said rotor shaft passes, said ring having an aperture therein through which said rotor shaft passes in snug, liquid sealing relation, at least an upper peripheral edge of said ring being rounded with a minimum curvature radius of approximately 0.125 inches to assure liquid slinging and to minimize liquid spraying.

7. The drain structure of claim 1, said upper endshield and said liquid drip pan being provided with spaced mating standards and socket members to support said liquid drip pan above said upper endshield a preselected distance.

8. The drain structure of claim 1, said upper endshield and said liquid drip pan being provided with spaced mating standards and socket members to support said liquid drip pan above said upper endshield a preselected distance, the tolerances between said standards and socket members being such that said liquid drip pan would bow downwardly toward its peripheral edge for gravity drain purposes in the event of inaccurate fit.

9. The drain structure of claim 1, said drain means including a pair of substantially opposed drain troughs communicating with substantially opposed openings in the side wall of said drip pan, each of said drain troughs terminating in a downwardly extending, outwardly sloping lip to ensure liquid draining beyond said upper endshield of said motor.

10. An improved drain structure for a vertically mounted electric motor to be positioned below a liquid sump of a dishwasher into which the rotor shaft can be connected comprising:

an electric motor including an upper endshield surrounding at least a portion of the motor, said endshield having a rotor shaft of said motor vertically extending therethrough and having spaced opposed vertically extending male standards thereon on opposite sides of said rotor shaft;

a liquid drip pan having spaced opposed female socket members extending from the lower face thereof to engage the male standards on said endshield and hold said drip pan in a substantially horizontal position a preselected distance thereabove, with the tolerances between said mating members being such that, in the event of inaccurate fit, said pan bows downwardly toward its peripheral edge, said drip pan having a central circular aperture therein through which said rotor shaft freely passes, said pan further having an upwardly vertical lip member surrounding said apertures and an upwardly extending vertical peripheral side wall with opposed drain openings therein;

a pair of opposed drain troughs connected to said drain openings in said peripheral side wall of said liquid drip pan, said troughs extending laterally outward beyond the outer extremities of said upper endshield of said motor to isolate liquid from the several parts of said motor, each trough necking inwardly as it extends outwardly and terminating in a downwardly extending, outwardly sloping lip to ensure liquid draining beyond said upper endshield of said motor; and, a flat, annular, liquid resistant slinger ring spaced from and sized to overlap said aperture in said drip pan, said slinger ring having a peripheral edge rounded with a minimum curvature radius of approximately 0.125 inches to assure liquid slinging and minimize spray and having a collar member integral with and extending downwardly from the periphery of said central aperture thereof to snugly engage said rotor shaft passing therethrough in liquid sealing relation, said slinger ring having an annular lip extending downwardly from the outer periphery thereof in spaced overlapping opposed relation with the lip on said liquid drip pan with the spacing between the opposed edge face of the downwardly extending lip from said slinger ring and the upper face of the overlapped drip pan, each being equal to or less than approximately 0.187 inches so that meniscus liquid leakage into said drip pan aperture is prevented.

\* \* \* \* \*